(12) United States Patent
Frode et al.

(10) Patent No.: US 9,945,320 B2
(45) Date of Patent: Apr. 17, 2018

(54) PISTON FOR AN INTERNAL COMBUSTIOIN ENGINE

(71) Applicant: FEDERAL-MOGUL NURNBERG GMBH, Nuremberg (DE)

(72) Inventors: Kay Frode, Stein (DE); Marian Meinhard, Furth (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 0 days.

(21) Appl. No.: 14/910,082

(22) PCT Filed: Jul. 30, 2014

(86) PCT No.: PCT/EP2014/066380
§ 371 (c)(1),
(2) Date: Feb. 4, 2016

(87) PCT Pub. No.: WO2015/018712
PCT Pub. Date: Feb. 12, 2015

(65) Prior Publication Data
US 2016/0177866 A1    Jun. 23, 2016

(30) Foreign Application Priority Data

Aug. 7, 2013   (DE) .................. 10 2013 215 538

(51) Int. Cl.

| F16J 1/14 | (2006.01) |
|---|---|
| F02F 3/28 | (2006.01) |
| F16J 1/00 | (2006.01) |
| F16J 1/16 | (2006.01) |
| F02F 3/22 | (2006.01) |

(52) U.S. Cl.
CPC ............... F02F 3/285 (2013.01); F02F 3/22 (2013.01); F16J 1/001 (2013.01); F16J 1/16 (2013.01)

(58) Field of Classification Search
CPC ........ F16J 1/18; F16J 1/001; F16J 1/16; F02F 3/285; F02F 3/22
USPC ......................................... 123/193.6; 92/187
See application file for complete search history.

(56) References Cited

U.S. PATENT DOCUMENTS

| 5,435,872 | A | * | 7/1995 | Penrice | ................... | B41F 16/00 |
|---|---|---|---|---|---|---|
| | | | | | | 123/193.6 |
| 5,713,262 | A | | 2/1998 | Sugiyama et al. | | |
| 6,279,456 | B1 | * | 8/2001 | Ueshima | ................... | F16J 1/18 |
| | | | | | | 92/153 |
| 7,845,269 | B2 | * | 12/2010 | Hayes | ................... | F01M 11/02 |
| | | | | | | 92/153 |
| 8,601,994 | B2 | | 12/2013 | Mukouhara et al. | | |

(Continued)

FOREIGN PATENT DOCUMENTS

| CN | 1472426 A | 2/2004 |
|---|---|---|
| CN | 2743561 Y | 11/2005 |

(Continued)

*Primary Examiner* — Marguerite McMahon
(74) *Attorney, Agent, or Firm* — Robert L. Stearns; Dickinson Wright, PLLC

(57) ABSTRACT

A piston (10) for an internal combustion engine has discrete, cylindrical support surfaces (18, 24) for supporting a piston pin, wherein, between at least two support surfaces (18, 24), there is provided a recess (26) which has a radial depth of at least 10% of half of the distance between two opposite support surfaces.

20 Claims, 1 Drawing Sheet

(56) References Cited

U.S. PATENT DOCUMENTS

| | | | |
|---|---|---|---|
| 8,720,405 B2* | 5/2014 | Golya | F02F 3/02 123/193.4 |
| 2005/0045124 A1 | 3/2005 | Amend et al. | |
| 2006/0037471 A1 | 2/2006 | Zhu et al. | |
| 2007/0095200 A1 | 5/2007 | Schroeder | |
| 2008/0250922 A1* | 10/2008 | Hayes | F01M 11/02 92/158 |
| 2010/0147252 A1* | 6/2010 | Langner | F02F 3/027 123/193.6 |
| 2010/0229820 A1* | 9/2010 | Iwata | F02F 3/00 123/193.6 |
| 2016/0115899 A1* | 4/2016 | Riffe | F02F 3/0084 123/193.6 |

FOREIGN PATENT DOCUMENTS

| | | |
|---|---|---|
| CN | 1959092 A | 5/2007 |
| CN | 101040136 A | 9/2007 |
| CN | 102224335 A | 10/2011 |
| DE | 3516305 A1 | 11/1986 |
| DE | 3625059 A1 | 1/1988 |
| DE | 102009032861 A1 | 3/2010 |
| DE | 102009019688 A1 | 11/2010 |
| WO | WO 03/098078 A1 | 11/2003 |
| WO | WO 2011/018142 A1 | 2/2011 |

* cited by examiner

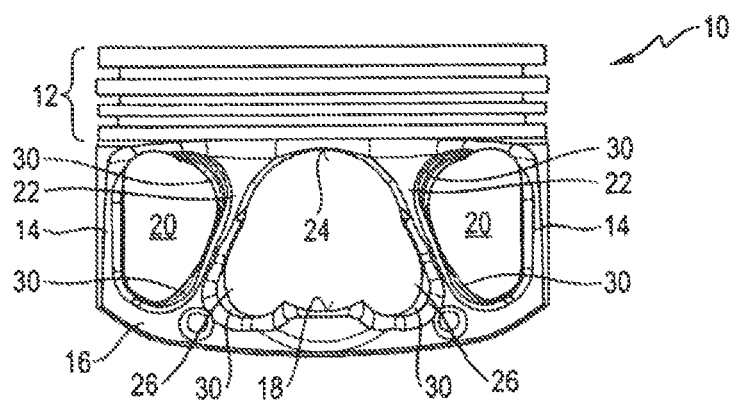
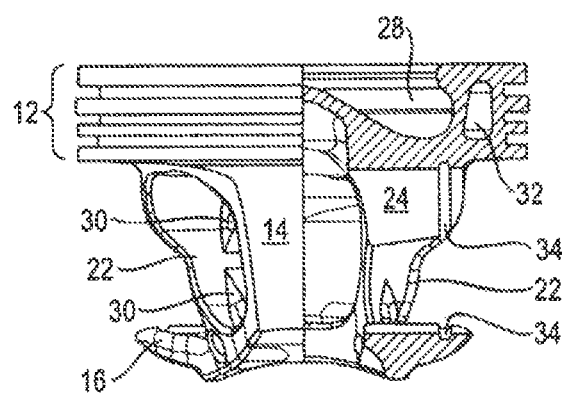
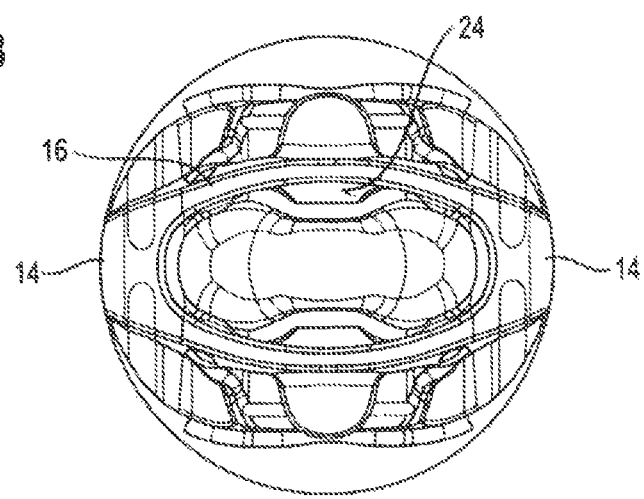

PISTON FOR AN INTERNAL COMBUSTIOIN ENGINE

BACKGROUND

1. Technical Field

The invention relates to a piston for an internal combustion engine.

In internal combustion engines pistons serve to be respectively moved translationally after the ignition of the fuel mixture and to transfer kinetic energy to the crankshaft via a piston pin and a connecting rod. In order to meet the requirements made of them the pistons have a ring zone in a region lying close to the combustion chamber. In order to accommodate the piston pin hubs are provided, and there are normally shaft walls in the plane perpendicular to the latter which serve as lateral support. The aforementioned functional regions, namely the ring zone, the pin hubs and the shaft walls, are generally connected by means of so-called connecting or side walls that extend between the shaft walls, respectively accommodate a pin hub and additionally serve to support the ring zone.

In this technical domain it is always desirable to reduce the compression height, i.e. the distance between the end of the ring zone directed towards the combustion chamber and the middle of the piston pin, because in this way one can cut down on weight. However, this is in conflict with the objective of the requirement to satisfy the demands in view of the rigidity of the piston.

2. Related Art

In the prior art various piston configurations are known with which attempts have been made, by taking a wide variety of measures, to keep the compression height and the weight low. With the piston according to DE 10 2009 032 861 A1 this takes place, for example, by means of large-scale "windows" in the connecting walls.

SUMMARY OF THE INVENTION

The object of the invention is to devise a piston for an internal combustion engine that is further improved with regard to the compression height and/or the weight, at the same time the requirements relating to the rigidity of the piston having to be fulfilled.

Consequently, instead of the usual substantially cylindrical pin hubs, this piston has discrete support surfaces that correspond substantially to sections of cylinder inner surfaces. Between at least two such support surfaces there is provided a recess which has a (radial) depth of at least 10% of half of the distance between two opposite support surfaces. The half of the distance between two opposite support surfaces essentially designates the radius of the typically cylindrical piston pin that is to be accommodated, and the depth of the recess measured in the radial direction of the piston pin is therefore an order of magnitude of millimeters with normal piston pin dimensions. In other words, this results in clear and large-scale windows at points at which sections of the pin hub were previously provided. In particular, it has transpired with initial calculations that it is sufficient if the piston pin, as considered in the direction of the piston axis, is supported in an upper region, i.e. a region close to the ring zone, and a lower region lying opposite the ring zone. To a certain extent the described "windows" can be formed to the side of the latter, and in particular in the lower half, and one can greatly cut down on weight. The stress amplitudes for the piston according to the invention have been determined by means of finite elements and compared with a previously normal piston design. It has become clear here that the stress amplitudes on the edge of the bowl in the pin plane are almost 20% less, and on the edge of the bowl in the plane perpendicular to the latter and on the bottom of the bowl in the pin plane are also less by the order of magnitude of 5% to 10%.

Furthermore, a securing groove can be formed for a ring in order to secure the piston pin only in the regions of the described support surfaces, and it has been found that in this way sufficient securing of the piston pin is guaranteed.

With regard to the piston according to the invention it should be mentioned that the latter can furthermore be provided with a cooling channel, and that in this case casting is preferred as the production method. It should additionally be mentioned that the structures described, i.e. the struts, the ribs and/or the ring, can be shaped, for example, by means of appropriate demoulding inclines so that the demoulding can be guaranteed in the case of production in appropriate casting tools. However, production by forging is also conceivable, in this case steel being the preferred material. However, independently of the production method, aluminum or an aluminum alloy are also conceivable as the material for the piston according to the invention. The shaft walls can be wider in the region of their connection to the ring zone than in their normal "lower" region. However, in certain applications the shaft walls can also be designed in reverse, i.e. they can be wider in their normal extension than in the region of their connection to the ring zone. In particular, the size of the shaft walls can be adjusted to the lateral forces to be transferred.

As regards the depth of the recess(es) according to the invention it should be mentioned that it can be up to 50% of the piston pin radius. In general, the piston according to the invention is based on the basic idea of producing the flux of forces and the required rigidity without providing the previously normal side walls, and of thus cutting down on weight and reducing the compression height. Preferably, the piston according to the invention is combined with a cylindrical piston pin.

For a support surface positioned closer to a ring zone it is currently preferred if it covers a larger angle, in particular 120° to 180°, preferably 150° to 170°, in the circumferential direction of the piston pin than an opposite support surface for which an angle of only approximately 40° to 90°, preferably approximately 60°, is currently provided.

Furthermore, for the support surface positioned closer to the ring zone it is preferred if it is extended in the direction of the piston axis so as to only allow minimal play for the connecting rod and its movement.

With regard to cutting down further on weight there are advantages if the recess according to the invention is delimited on the side lying opposite the piston pin to be accommodated by a strut on the other side of which, i.e. the side directed towards the shaft wall, there is also a recess. In other words, the previously normal side walls are replaced by two typically symmetrical struts which have extensive recesses on both sides, and so there are no longer the previously normal side walls and the weight of the latter can be cut down on. In initial calculations one has been able to establish that the required rigidity can also be guaranteed by the struts described.

With regard to the configuration of the struts it has also been proven to be advantageous to make the latter narrower in a region spaced apart from the ring zone than in a region close to the ring zone.

Furthermore, it is advantageous for rigidity if the struts are made to converge towards the ring zone. In other words, the two struts that are typically present on each side are inclined towards one another in the direction of the ring zone as considered in the direction of the piston pin axis. In this way one can guarantee particularly good support of the ring zone in the interior of which the combustion chamber is delimited and in particular a combustion chamber bowl can be formed.

With regard to the connection of the functional regions described at the start which is also provided, a preferably oval ring is currently provided which is formed on the end of the piston opposite the ring zone and connects the shaft walls, a support surface lying spaced apart from the annular field, and optionally the struts described to one another. The ring is preferably made to be as narrow as possible here, in particular oval, because in this way one can further cut down on weight, and the minimal play required for the connecting rod and its movement can, furthermore, be guaranteed.

In order to guarantee the rigidity of the struts it is currently preferred if the latter have reinforcing ribs on the cross-over to the ring zone and/or to the ring. Furthermore, by means of these ribs stresses are reduced at the described cross-overs.

BRIEF DESCRIPTION OF THE DRAWINGS

In the following an embodiment of the invention shown as an example in the drawings will be described in more detail. These show as follows:

FIG. 1 a view of the piston according to the invention, as considered in the direction of the piston pin axis;

FIG. 2 a side view in a direction perpendicular to this; and

FIG. 3 a bottom view of the piston according to the invention.

DETAILED DESCRIPTION

As can be seen in FIG. 1, the piston 10 according to the invention has in its region directed towards a combustion chamber and which is at the top on the illustration of FIG. 1 a ring zone 12, and for lateral support it has the shaft walls 14 that can be seen better in FIG. 2. In the exemplary embodiment shown the shaft walls 14 are only connected to one another by a ring provided in the lower region of the piston and which additionally carries a first support surface 18 for the piston pin (not shown). The connecting walls traditionally provided between the shaft walls 14 are not present. In fact, by means of first recesses 20, respectively between the shaft walls 14, and struts 22 running at an angle to one another in the direction of the ring zone 12, one can greatly cut down on weight.

In the embodiment shown the support of the piston pin (not shown) is provided in a lower region by means of the first support surface 18 that only covers an angle of approximately 60° in the embodiment shown. Lying opposite, i.e. closer to the ring zone, a second support surface 24 is provided that in the embodiment shown covers a larger angle, for example approximately 170°. Between these two support surfaces additional recesses 26 are provided that in the embodiment shown have a depth (measured in the radial direction of the piston pin) of approximately 40% of the piston pin radius. The large-scale design of the recesses 26 is also manifested by the support surfaces 18 and 24 being respectively offset from the recesses 26 by edges or kinks. In this way one can cut down greatly on additional weight, and by means of the support surfaces 18, 24 the necessary support and "clasping" of the piston pin is nevertheless guaranteed. This applies in the same way to the lateral support by means of the shaft walls 14 and the support of the ring zone 12 and a combustion chamber bowl 28 preferably formed in the latter (see FIG. 2). The functional regions described are advantageously connected by the ring 16 provided on the lower edge. In FIG. 1 ribs 30 can additionally be seen which provide additional support on the cross-overs between the struts 22 and the ring zone 12 and prevent stress peaks.

In FIG. 2 it can be seen that the piston according to the invention can have a cooling channel 32 and that a securing groove 34 for a securing ring can respectively be provided in the region of the support surfaces 18, 24. It can be seen for the lower ring 16 in FIG. 2 and particularly well in FIG. 3 that it is largely oval and is held as close as possible around the region in which there is a connecting rod in the fitted state. For the struts 22 it can be added with reference to FIG. 2 that they can be made to be narrower in a lower region, i.e. substantially beneath a piston pin axis than in FIG. 2. In FIG. 2 it can additionally be seen that the struts 22 have a clear extension in the direction of the piston pin axis and that the reinforcing ribs 30 are provided in zones that lie comparably close to the piston axis. For the shaft walls 14 it can be seen in FIG. 2 that they are wider in the region of the connection to the ring zone 12 than in their lower region. However, in certain applications this configuration can also be made in reverse or with the width remaining consistent.

In FIG. 3 the ring that has been described as being oval is additionally shown. The oval form can be seen in particular on the inside of the ring. Over large regions in the vicinity of the piston pin axis the ring has a wall thickness that remains consistent. However, this wall thickness is larger in outer regions in which the ring passes into the shaft walls 14. In FIG. 3 one can finally see that the support surface 24 adjacent to the ring zone 12 is extended in the direction of the piston pin axis (that according to FIG. 3 is perpendicular to the plane of the drawing) in particular in a crown region, i.e. In the zone lying closest to the ring zone 12. In this way minimal play can be guaranteed for a connecting rod to be accommodated.

What is claimed is:

1. A piston for an internal combustion engine that has discrete, cylindrical support surfaces for supporting a piston pin, wherein between at least two support surfaces there is provided a pair of recesses which are symmetrically sized and arranged on opposite sides of a vertical plane that bisects said piston along a central axis of said support surfaces, each of said recesses having a radial depth of at least 10% of half of the distance between two opposite support surfaces, and wherein a support surface positioned closer to a ring zone covers a larger angle in the circumferential direction of the piston pin than an opposite support surface that preferably has an angle of approximately 40° to 90°.

2. The piston according to claim 1, wherein the support surface positioned closer to the ring zone is extended in the direction of the piston axis.

3. The piston according to claim 1, including at least one strut adjacent said recesses.

4. The piston according to claim 3, wherein said at least one strut has a narrow width portion in a region spaced apart from the ring zone and a relatively thicker portion in a region close to the ring zone.

5. The piston according to claim 3, wherein there are two of said struts and said struts converge towards the ring zone.

6. The piston according to claim 3, wherein said piston has an oval ring on the end opposite the ring zone which connects shaft walls, the support surface lying spaced apart from the ring zone.

7. The piston according to claim 3, wherein the least one strut has at least one reinforcing rib at a cross-over to the ring zone and/or to the ring.

8. The piston according to claim 1, wherein said larger angle is between 120° and 180°.

9. The piston according to claim 1, wherein said larger angle is between 150° and 170°.

10. The piston according to claim 1, wherein said angle of said opposite support surface is about 60°.

11. The piston according to claim 8, wherein said angle of said opposite support surface is about 60°.

12. The piston according to claim 9, wherein said angle of said opposite support surface is about 60°.

13. The piston of claim 6, wherein said support surface is spaced apart from the at least one strut.

14. A piston for an internal combustion engine comprising;
a top portion including a ring zone and a top surface;
a bottom portion extending downwardly from said top portion said bottom portion having a pair of pin bosses defining a pair of laterally spaced pin bores aligned with one another along a pin bore axis with each of said pin bores presenting a pair of support surfaces including a first support surface and a second support surface disposed in a spaced relationship with one another defining a distance therebetween with said first support surface being spaced from said ring zone of said top portion and said second support surface being adjacent said ring zone of said top portion;
said bottom portion defining a pair of recesses extending along said pin bore axis and having a radial depth of at least 10% of half of said distance said recesses being symmetrically sized and arranged on opposite sides of a vertical plane that is perpendicular to said top surface of said piston and which bisects said piston along said pin bore axis; and
said second support surface covering a larger angle in a circumferential direction relative to said pin bore axis than said first support surface.

15. The piston according to claim 14 further including at least one strut extending between said top portion and said bottom portion and defining recesses disposed on said bottom portion spaced from said pin bores.

16. The piston according to claim 15, wherein said at least one strut includes two struts disposed in a spaced relationship with one another converging toward said ring zone of said top portion.

17. The piston according to claim 15, wherein said bottom portion defines recesses disposed spaced from said pin bores.

18. A piston for an internal combustion engine comprising;
a top portion including a ring zone and a top surface;
a bottom portion extending downwardly from said top portion said bottom portion having a pair of pin bosses defining a pair of laterally spaced pin bores aligned with one another along a pin bore axis with each of said pin bores presenting a pair of support surfaces including a first support surface and a second support surface disposed in a spaced relationship with one another defining a distance therebetween with said first support surface being spaced from said ring zone of said top portion and said second support surface being adjacent said ring zone of said top portion; and
wherein said first support surface and said second support surface are each symmetrically sized and arranged on opposite sides of a vertical plane that bisects said piston along said pin bore axis.

19. The piston according to claim 18, wherein said bottom portion defines a recess extending along said pin bore axis and having a radial depth of at least 10% of half of said distance.

20. The piston according to claim 19, wherein said second support surface covers a larger angle in a circumferential direction relative to said pin bore axis than said first support surface with said first support surface covering a circumferential angle of between 40° and 90°.

* * * * *